(12) United States Patent
Jones et al.

(10) Patent No.: US 9,332,401 B2
(45) Date of Patent: May 3, 2016

(54) PROVIDING DYNAMICALLY-TRANSLATED PUBLIC ADDRESS SYSTEM ANNOUNCEMENTS TO MOBILE DEVICES

(71) Applicant: INTERNATIONAL BUSINESS MACHINES CORPORATION, Armonk, NY (US)

(72) Inventors: Gregory S. Jones, Lewisville, TX (US); Catherine A. McCauley, Colleyville, TX (US); John S. Pannell, Keller, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 13/974,151

(22) Filed: Aug. 23, 2013

(65) Prior Publication Data
US 2015/0056961 A1  Feb. 26, 2015

(51) Int. Cl.
*H04W 4/02* (2009.01)
*H04W 4/14* (2009.01)
(Continued)

(52) U.S. Cl.
CPC .............. *H04W 4/06* (2013.01); *G06F 17/28* (2013.01); *G06F 17/289* (2013.01); *H04L 12/1845* (2013.01); *H04L 51/063* (2013.01); *H04L 67/26* (2013.01); *H04L 67/2823* (2013.01); *H04W 4/028* (2013.01); *H04W 4/18* (2013.01)

(58) Field of Classification Search
CPC ..... H04W 4/14; H04W 4/02; H04M 2242/14; H04M 2207/18; G08B 25/012; H04Q 2213/1337; H04L 51/10; H04L 67/26; G06F 17/289; G06F 17/28; G06F 2221/2111
USPC ............. 455/414.1, 546.1, 466, 404.2, 422.1; 381/83, 77, 82; 370/338
See application file for complete search history.

(56) References Cited

U.S. PATENT DOCUMENTS

| | | | |
|---|---|---|---|
| 4,468,804 A | | 8/1984 | Kates et al. |
| 5,946,615 A | * | 8/1999 | Holmes .................. H04L 67/16 455/412.1 |

(Continued)

FOREIGN PATENT DOCUMENTS

| | | | |
|---|---|---|---|
| GB | 2499682 A | * | 8/2013 |
| GB | 2499695 B | * | 10/2014 |

*Primary Examiner* — Sharad Rampuria
*Assistant Examiner* — Obidon Bassinan
(74) *Attorney, Agent, or Firm* — Patents on Demand P.A.; Brian K. Buchheit; Scott M. Garrett

(57) ABSTRACT

A method for providing dynamically translated public address announcements can begin with a multi-lingual module maintaining a listing of mobile devices that are currently active within a specified geographic area serviced by a public address system. The native language used by a mobile device that is different than a language used by the public address system can be noted. Content for an announcement broadcast by the public address system can be converted into a format capable of being transmitted via a wireless communications message. The converted content can be translated to the native languages noted in the listing. The wireless communications message containing the translated content can be pushed to corresponding mobile devices in the listing and the wireless communications message containing the converted content can be pushed to a remainder of the mobile devices in the listing via a non-cellular wireless network local to the specified geographic area.

20 Claims, 5 Drawing Sheets

(51) Int. Cl.
  *H04W 4/06* (2009.01)
  *G06F 17/28* (2006.01)
  *H04L 29/08* (2006.01)
  *H04L 12/58* (2006.01)
  *H04L 12/18* (2006.01)
  *H04W 4/18* (2009.01)

(56) References Cited

U.S. PATENT DOCUMENTS

| | | | |
|---|---|---|---|
| 6,266,642 B1 * | 7/2001 | Franz | G06F 17/271 704/257 |
| 6,385,586 B1 * | 5/2002 | Dietz | G06F 17/289 704/251 |
| 7,272,377 B2 * | 9/2007 | Cox | H04M 3/42229 455/403 |
| 8,185,374 B2 * | 5/2012 | Kong | G06F 9/4448 704/2 |
| 8,345,827 B2 | 1/2013 | Liebermann et al. | |
| 8,452,026 B2 | 5/2013 | Sherman | |
| 8,504,351 B2 * | 8/2013 | Waibel | G06F 17/289 704/2 |
| 2003/0115059 A1 * | 6/2003 | Jayaratne | G06F 17/289 704/235 |
| 2003/0149557 A1 * | 8/2003 | Cox | H04M 3/42229 704/2 |
| 2008/0108328 A1 | 5/2008 | Lovell | |
| 2010/0215187 A1 * | 8/2010 | Moosavi | H04R 27/00 381/82 |
| 2011/0216915 A1 | 9/2011 | Gharachorloo et al. | |
| 2012/0190325 A1 | 7/2012 | Abu-Hakima et al. | |
| 2012/0269362 A1 | 10/2012 | Sheth et al. | |

* cited by examiner

100

```
A multitude of mobile device users, each
having a native language in which they
interface with their mobile device,
congregate in a geographic area serviced by
a public address system having a multi-
lingual module
                                          105
```
↓
```
Public address (PA) system broadcasts an
announcement using a predetermined
default language within the geographic area
                                          110
```
↓
```
Mobile device users whose native language
differs from the default language of the
announcement receive a translated version
of the announcement on their mobile device
                                          115
```

FIG. 1

PROVIDING DYNAMICALLY-TRANSLATED PUBLIC ADDRESS SYSTEM ANNOUNCEMENTS TO MOBILE DEVICES

BACKGROUND

The present invention relates to the field of wireless communications and, more particularly, to providing dynamically-translated public address system announcements to mobile devices.

Conventional public address systems generally assume that the people hearing or reading the announcement understand the language in which it is spoken/written. In today's globally-diverse environment, this is often not the case. A simple approach for combating this problem has been to make the announcements in multiple languages. However, these languages are usually limited to those languages of the more prominent groups of visitors, leaving those from more minor language groups still at a disadvantage.

Translation software applications exist for mobile devices that will translate audio and/or text between languages. However, locations using public address systems are often quite noisy. This makes it difficult for a user to clearly capture the audio of the announcement being broadcast by the public address system, and, subsequently, the quality of the translation would most likely be poor.

BRIEF SUMMARY

One aspect of the present invention can include a method for providing dynamically translated public address announcements. Such a method can begin with a multi-lingual module maintaining a listing of mobile devices that are currently active within a specified geographic area serviced by a public address system. The native language used by a mobile device that is different than a language used by the public address system can be noted. Content for an announcement broadcast by the public address system can be converted into a format capable of being transmitted via a wireless communications message. The converted content can be translated to the native languages noted in the listing. The wireless communications message containing the translated content can be pushed to corresponding mobile devices in the listing and the wireless communications message containing the converted content can be pushed to a remainder of the mobile devices in the listing via a wireless network local to the specified geographic area. The wireless standard utilized by the wireless network can be IEEE 802.11 and/or IEEE 802.15.

Another aspect of the present invention can include a system for multi-lingual public address announcements. Such a system can include mobile devices, a digital public address system, and a multi-lingual module. The mobile devices can be capable of receiving and presenting wireless communications messages in a native language. The digital public address system can be configured to broadcast an announcement in a predetermined default language using standard output devices within a specified geographic area. The multi-lingual module can be configured to automatically rebroadcast the announcement, in real-time or near real-time, in a specified format, audio and/or text, as a wireless communications message in the native language of each mobile device within the specified geographic area via a wireless network local to the specified geographic area. The wireless standard utilized by the wireless network can be IEEE 802.11 and/or IEEE 802.15.

Yet another aspect of the present invention can include a computer program product that includes a computer readable storage medium having embedded computer usable program code. The computer usable program code can be configured to maintain a listing of mobile devices currently active within a specified geographic area serviced by a public address system. The native language of a mobile device that is different than a language used by the public address system can be noted. The computer usable program code can be configured to convert content for an announcement broadcast by the public address system into a format capable of being transmitted via a wireless communications message. The computer usable program code can be configured to translate the converted content to the native languages noted in the listing. The computer usable program code can be configured to push the wireless communications message containing the translated content to corresponding mobile devices having different native languages in the listing and the wireless communications message containing the converted content to a remainder of the mobile devices in the listing via a wireless network local to the specified geographic area. The wireless standard utilized by the wireless network can be IEEE 802.11 and/or IEEE 802.15.

BRIEF DESCRIPTION OF THE SEVERAL VIEWS OF THE DRAWINGS

FIG. 1 is a flowchart of a method describing a user's perspective of the operation of a public address system having a multi-lingual module in accordance with embodiments of the inventive arrangements disclosed herein.

DETAILED DESCRIPTION

Figure 2:
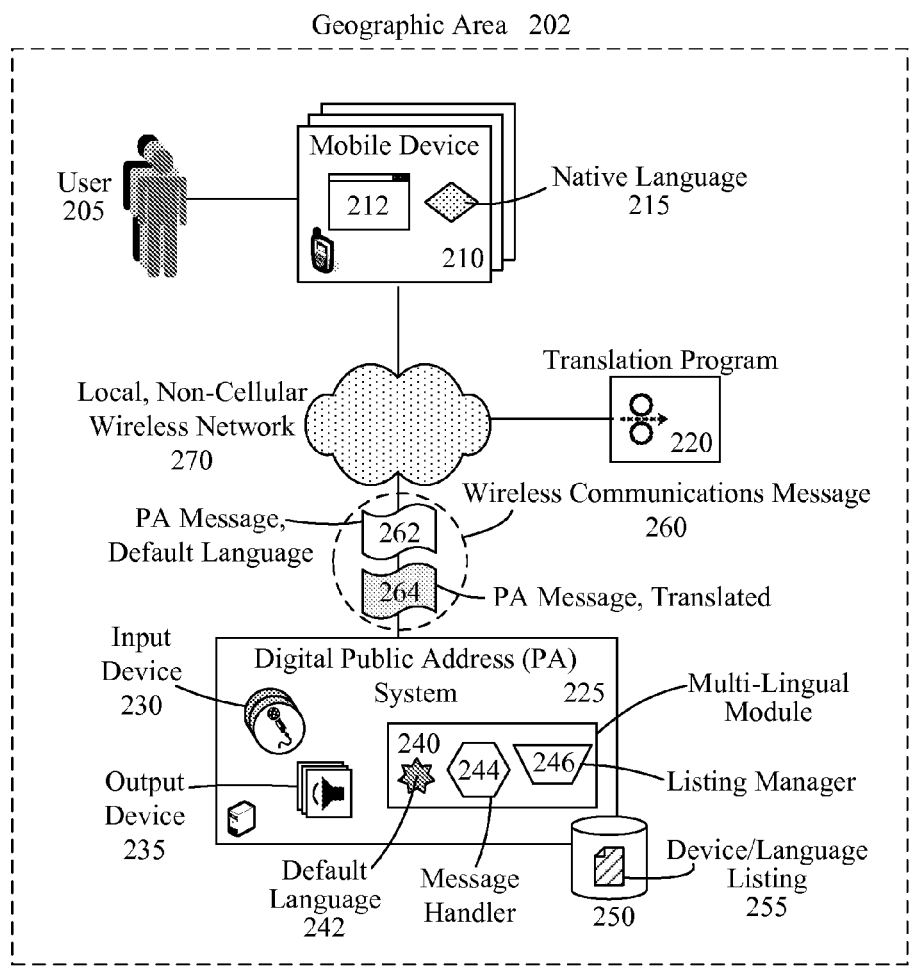
FIG. 2 is a schematic diagram of a system for utilizing a multi-lingual module with a digital public address system in accordance with an embodiment of the inventive arrangements disclosed herein.

The present invention discloses a solution for providing the announcements of a public address system as wireless communications messages to mobile devices, translated to the native language of the mobile device, as necessary. The multi-lingual module of a public address system can identify the native language used by mobile devices in the geographic area serviced by the public address system. Announcements broadcast by the public address system can be captured and converted to wireless communications messages. When the native language of a mobile device differs from a default language used by the public address system, the content of the message can be translated to the native language. The wireless communications messages can then be conveyed to the mobile devices using a non-cellular wireless network local to the geographic area.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of a method 100 describing a user's perspective of the operation of a public address system having a multi-lingual module in accordance with embodiments of the inventive arrangements disclosed herein. Method 100 can begin with step 105 where a multitude of mobile device users congregate in a geographic area that is serviced by a public address system having a multi-lingual module.

The geographic area can have known boundaries and can encompass one or more structures. For example, the geographic area can be a community park. As another example, the geographic area can be an airport having multiple indoor and outdoor spaces.

The public address (PA) system can broadcast an announcement using a predetermined default language within the geographic area in step 110. The announcement can be audio or text. All mobile device users within the geographic area can receive (hear or see) the same announcement. In step 115, the mobile device users whose native language differs from the default language can receive a translated version of the announcement on their mobile device.

Conventional approaches for providing public address system announcements can end with step 110 and can assume that all people in the geographic area of the announcement are able to understand the default language. In today's global society, it can be commonplace to have people of various native languages in large gathering areas, particularly places associated with travel and tourism.

Those unable to understand the language of the announcement can be at a severe disadvantage. To address this problem, conventional public address systems can repeat an announcement in another language; typically a language corresponding to another group of visitors or patrons. However, this approach still cannot help all visitors/patrons in the geographic area.

The present disclosure can provide the same information all users in the geographic area by leveraging translation and mobile device technologies that conventional solutions overlook.

FIG. 2 is a schematic diagram of a system 200 for utilizing a multi-lingual module 240 with a digital public address system 225 in accordance with embodiments of the inventive arrangements disclosed herein. System 200 can be used to perform the steps of method 100.

In system 200, users 205 can be located within a geographic area 202 that is serviced by a digital public address system 225, herein referred to as the public address system 225. The users 205 can be people and can have one or more active mobile devices 210 in their possession.

A mobile device 210 can represent a variety of portable electronic and/or computing devices capable of communicating with the public address system 225 over a local, non-cellular wireless network 270, herein referred to as network 270, to receive and present wireless communications messages 260. Examples of the mobile device 210 can include, but are not limited to, a laptop computer, a notebook computer, a tablet computer, a smartphone, a Web-enabled multimedia device, and the like.

The mobile device 210 can be configured with a specified native language 215; the native language 215 can be preset by a manufacturer or retailer or can be a system setting selected by the user 205. The native language 215 can be a language supported by the mobile device 210 for user 205 interactions. For example, the mobile device 210 can display the text of its user interface using the native language 215 as well as accept voice commands in the native language 215.

For the sake of discussion, it can be assumed that, in the case of a mobile device 210 shared among multiple users 205, all users 205 understand the native language 215 set for the mobile device 210.

The geographic area 202 can be a physical space in which the public address system 225 is installed and operates within. The geographic area 202 can include open areas as well as enclosed or semi-enclosed structures. The public address system 225 can represent the hardware and/or software necessary to broadcast public address (PA) announcements within the geographic area 202 and rebroadcast the PA announcements as wireless communications messages 260 to mobile devices 210.

Like its conventional counterpart, the public address system 225 can include input 230 and output 235 devices that accept and broadcast announcements. For example, flight attendants at a gate of an airport terminal 202 can make announcements by speaking into a microphone 230 and the speech is output to various speakers 235. As another example, announcements can be textually or graphically displayed upon monitors 235 or scrolling LED bars 235.

The input 230 and output 235 devices can further include components for rebroadcasting a PA announcement. The specific types of input 230 and output 235 devices used can be dependent upon implementation and system architecture. For example, a connection to the network 270 can be a required output device 235 for the public address system 225.

The public address systems 225 can also include a multi-lingual module 240 and a data store 250 for storing a device/language listing 255. The multi-lingual module 240 can be the hardware and/or software necessary for converting PA announcements to wireless communications messages 260 and dynamically translating the content to the native language 215 of the mobile devices 210, as needed.

As illustrated in method 100 of FIG. 1, a conventional system can assume that all users 205 within the geographic area 202 understand the language the PA announcement is spoken or written. The multi-lingual module 240 can allow the public address system 225 to overcome this invalid assumption by providing the content of the PA announcement to each user's 205 mobile device 210 in their specified native language 215.

The multi-lingual module 240 can include a default language 242, a message handler 244, and a listing manager 246. The default language 242 can represent the language primarily used by the public address system 225 for PA announcements. For example, the international terminal 202 of an airport located in the United States would most likely have English as the default language 242.

The listing manager 246 can be the component of the multi-lingual module 240 responsible for maintaining the device/language listing 255. The device/language listing 255 can identify all the active mobile devices 210 within the geographic area 202 and their native language 215. For the sake of efficiency, the device/language listing 255 can only indicate the native language 215 for a mobile device 210 when the native language 215 differs from the default language 242; the default language 242 can be assumed for all mobile devices 210 that do not have a native language 215 listed.

The listing manager 246 can be configured to automatically discover mobile devices 210 capable of connecting to the network 270 (i.e., BLUETOOTH-enabled devices are capable of automatic discovery). Once discovered, the listing manager 246 can request the native language 215 from the mobile device 210. The listing manager 246 can remove a mobile device 210 from the device/language listing 255 when the mobile device 210 is determined to no longer be within the geographic area 202 or accessible over the network 270.

For example, the listing manager 246 can periodically poll or "ping" the mobile devices 210 in the device/language listing 255. When a mobile device 210 does not reply in a preset amount of time or fails to reply to a predetermined number of polls, the mobile device 210 can be deemed out of the geographic area 202.

The message handler 244 can be the component if the multi-lingual module 240 configured to convert PA announcement to wireless communications messages 260. The message handler 244 can include additional components (not shown), when necessary, to convert the content of the PA announcement to different formats.

For example, the PA announcements can be verbally inputted into the public address system 225 (i.e., speaking into a microphone 230). The message handler 244 can include components to capture the audio of the PA announcement. Further, the message handler 244 can include components like a speech-to-text and/or text-to-speech engines to transform audio to text and vice versa, depending on what format the content of the PA announcement is to have in the wireless communications message 260.

The message handler 244 can be further configured to utilize a translation program 220 to translate the content of a wireless communication message 260 from the default language 242 to the native language 215 of a mobile device 210. Multiple translation programs 220 can be used to address the wide variety of native languages 215.

In this example, the message handler 244 can communicate with the translation program 220 over the network 270. In another embodiment, the translation program 220 can run local to the multi-lingual module 240. In another contemplated embodiment, the translation program 220 can be a service operated by a third-party like a Web service that the multi-lingual module 240 utilizes as needed Thus, the wireless communications messages 260 generated and transmitted by the message handler 244 can include PA messages 262 in the default language and PA messages 264 in the native languages 215 of the mobile devices 210 in the geographic area 202.

In another embodiment of the present disclosure, the functionality of the message handler 244 can be implemented in a client-server architecture. Each mobile device 210 can have an agent application 212 installed upon it. The agent application 212 can be a software program configured to translate PA messages 262 received from the message handler 244 in the default language to the native language 215 of the mobile device 210.

In such an embodiment, the agent application 212 can communicate with the translation program 220 over the network 270 or the Internet. Alternately, the agent application 212 can include the translation program 220. This embodiment can relieve the listing manager 246 from having to track the native language 215 of mobile devices 210 in the geographic area 202.

As shown in this example, the multi-lingual module 240 can be an integrated component of the public address system 225. In another embodiment, the multi-lingual module 240 can be implemented as a plug-in component to an existing public address system 225. In yet another embodiment, the multi-lingual module 240 can be a stand-alone system that communicates with the public address system 225 over the network 270 or a wire-based network.

Although the use of a digital public address system 225 is discussed within the Figures, it should be noted that the present disclosure can also be applied to analog public address systems with minor modifications to account for signal transformations.

The provision of the translated PA messages 264 by the public address system 225 can also be implemented as a subscription service or feature to an existing software application for mobile devices 210.

As used herein, presented data store 250 can be physical or virtual storage space configured to store digital information. Data store 250 can be physically implemented within any type of hardware including, but not limited to, a magnetic disk, an optical disk, a semiconductor memory, a digitally encoded plastic memory, a holographic memory, or any other recording medium. Data store 250 can be a stand-alone storage unit as well as a storage unit formed from a plurality of physical devices. Additionally, information can be stored within data store 250 in a variety of manners. For example, information can be stored within a database structure or can be stored within one or more files of a file storage system, where each file may or may not be indexed for information searching purposes. Further, data store 250 can utilize one or more encryption mechanisms to protect stored information from unauthorized access.

The network 270 can include any hardware/software/and firmware necessary to convey data encoded within carrier waves. Data can be conveyed though data or voice channels. Network 270 can include local components and data pathways necessary for communications to be exchanged among computing device components and between integrated device components and peripheral devices. Network 270 can also include network equipment, such as routers, data lines, hubs, and intermediary servers which together form a data network, such as the Internet. Networks 270 can include line based pathways in its infrastructure; however, transmissions to mobile devices 210 can occur using the IEEE 802.11 and/or IEEE 802.15 wireless standard.

Figure 3:
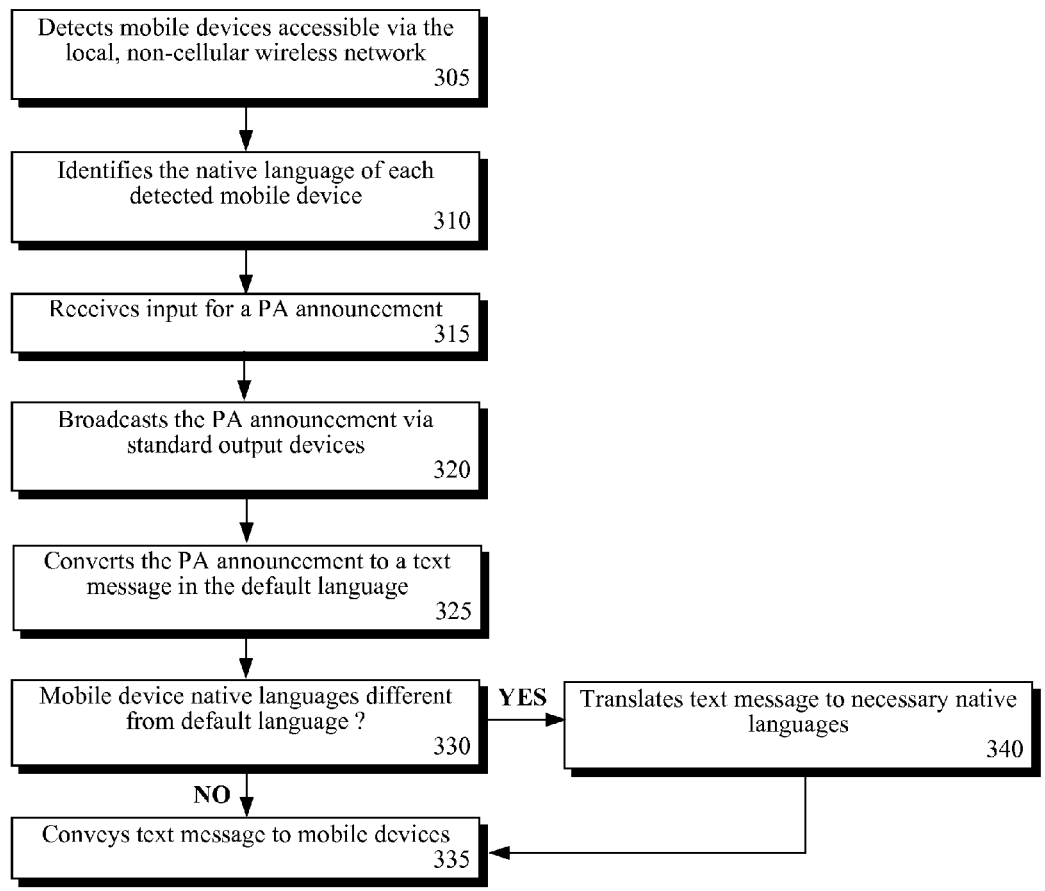
FIG. 3 is a flowchart of a method detailing the basic operation of a public address system having a multi-lingual module in accordance with an embodiment of the inventive arrangements disclosed herein.

FIG. 3 is a flowchart of a method 300 detailing the basic operation of a public address system having a multi-lingual module in accordance with embodiments of the inventive arrangements disclosed herein. The steps of method 300 can be performed within the context of system 200.

Method 300 can begin with step 305 where the public address system detects mobile devices accessible via the local, non-cellular wireless network. The native language of each detected mobile device can be identified in step 310. In step 315, input can be received for a PA announcement.

The PA announcement can be broadcast using standard output devices in step 320. In step 325, the PA announcement can be converted to a text message in the default language. In step 330, it can be determined if there are detected mobile devices having native languages that differ from the default language.

When mobile devices are present that have a native language different from the default language, the text message can be translated to the necessary native languages in step 340. Upon completion of step 340 or when the native language of all the mobile devices is the same as the default language, step 335 can be performed where the text message is conveyed to the mobile devices.

It should be noted that, while the above example utilizes text messages as the format of the wireless communications message sent to the mobile device, other formats, such as audio and multimedia, can be used within the spirit of the present disclosure.

Figure 4:
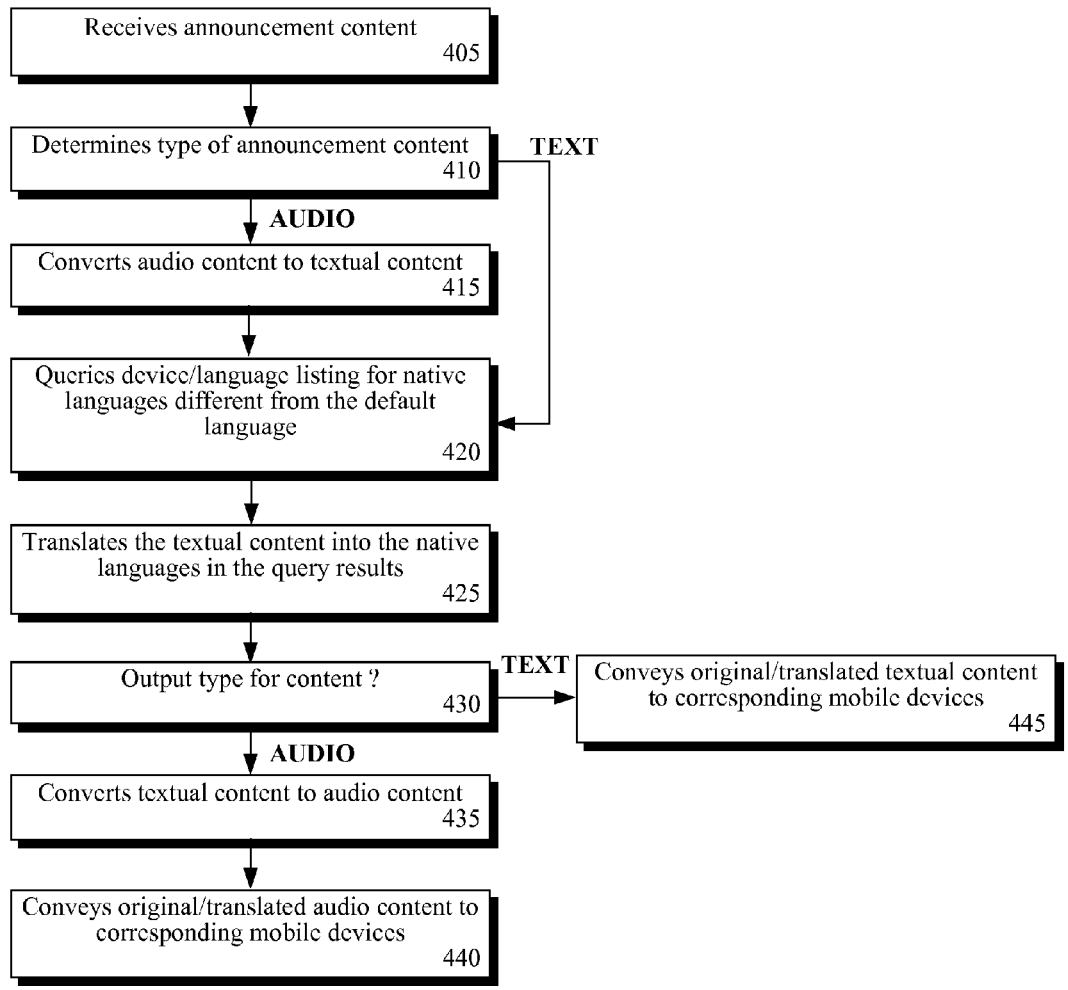
FIG. 4 is a flowchart of a method describing operation of the multi-lingual module in accordance with embodiments of the inventive arrangements disclosed herein.

FIG. 4 is a flowchart of a method 400 describing operation of the multi-lingual module in accordance with embodiments of the inventive arrangements disclosed herein. The steps of method 400 can be performed within the context of system 200 and/or method 300.

Method 400 can begin with step 405 where the multi-lingual module receives the content of the PA announcement broadcast by the public address system. The type of the announcement content can be determined in step 410. Audio content can be converted to textual content in step 415.

Upon completion of step 415 or when the content is already in a text format, step 420 can be performed where the device/language listing can be queried for native languages different from the default language. The textual content can be translated to the native languages in the query results in step 425. In step 430, the output type for the content can be determined.

When the output type is audio, the textual content can be converted to audio content in step 435. In step 440, the original and translated audio content can then be conveyed to the corresponding mobile devices. When the output type is text, step 445 can be performed where the original and translated textual content can be conveyed to the corresponding mobile devices.

Figure 5:
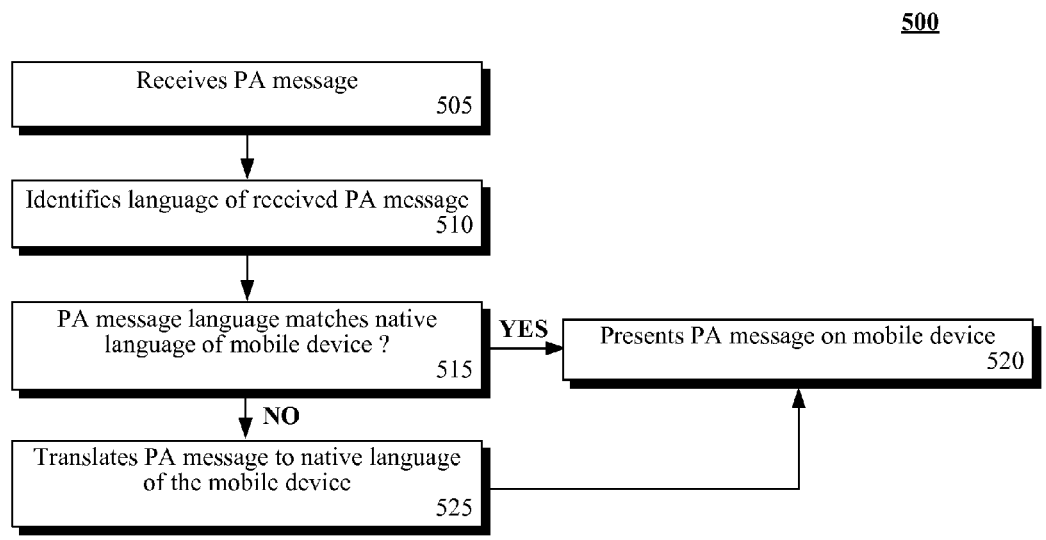
FIG. 5 is a flowchart of a method illustrating the operation of an agent application of the multi-lingual module in accordance with embodiments of the inventive arrangements disclosed herein.

FIG. 5 is a flowchart of a method 500 illustrating the operation of an agent application of the multi-lingual module in accordance with embodiments of the inventive arrangements disclosed herein. The steps of method 500 can be performed within the context of system 200 and/or method 300.

Method 500 can begin with step 505 where the agent application can receive a PA message from the multi-lingual module. The language of the received PA message can be identified in step 510. In step 515, it can be determined if the identified language of the PA message matches the native language of the mobile device.

When the language of the PA message does not match the native language of the mobile device, step 525 can be performed where the PA message is translated to the native language of the mobile device. Upon completion of step 525 or when the language of the PA message matches the native language of the mobile device, the PA message can be presented upon the mobile device in step 520.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for dynamically translating the public address announcement comprising:
    maintaining a listing of mobile devices currently active within a specified geographic area serviced by a public address system by a multi-lingual module, wherein a native language of a mobile device that is different than a language used by the public address system is automatically noted from the mobile device;
    converting content for an announcement broadcast by the public address system into a format capable of being transmitted via a wireless communications message;
    translating the converted content to native languages noted in the listing; and
    pushing the wireless communications message containing the translated content to corresponding mobile devices in the listing and the wireless communications message containing the converted content to a remainder of the mobile devices in the listing via a wireless network local to the specified geographic area, wherein a wireless standard utilized by said wireless network comprises at least one of IEEE 802.11 and IEEE 802.15.

2. The method of claim 1, wherein maintaining the listing further comprises:
    automatically detecting a presence of the mobile device within the specified geographic area, wherein said detection provides identifying information about the mobile device necessary for establishing a communications pathway to said mobile device;
    recording the mobile device in the listing;
    requesting the native language used by the mobile device; and
    when the native language differs from the language used by the public address system, appending a record for the mobile device in the listing with the native language.

3. The method of claim 1, wherein converting content further comprises:
    capturing audio spoken into an input device of the public address system in a digital format; and
    transforming the audio into text using a speech-to-text engine.

4. The method of claim 3, wherein, when the content is to be provided in an audio format, said translating of the content further comprises:
    returning the text of the translated content to audio using a text-to-speech engine appropriate to the corresponding native language.

5. The method of claim 1, wherein converting content further comprises: capturing text provided as input for the announcement in a digital format.

6. The method of claim 5, wherein, when the content is to be provided in an audio format, said translating of the content further comprises:
    transforming the text of the translated content into audio using a text-to-speech engine appropriate to the corresponding native language.

7. The method of claim 1, wherein the translating of the content is performed by the mobile device.

8. A system for multi-lingual public address announcements comprising:
    a plurality of mobile devices capable of receiving and presenting wireless communications messages, wherein a native language is defined for each mobile device;
    a digital public address system configured to broadcast an announcement in a predetermined default language using standard output devices within a specified geographic area; and
    a multi-lingual module configured to automatically rebroadcast the announcement, in real-time or near real-time, in a specified format as a wireless communications message in the native language of each mobile device within the specified geographic area via a wireless network local to the specified geographic area, wherein the multi-lingual module is configured to automatically note the native language from the mobile device, and wherein a wireless standard utilized by said wireless network comprises at least one of IEEE 802.11 and IEEE 802.15, wherein the specified format comprises at least one of audio and text.

9. The system of claim 8, wherein the multi-lingual module further comprises:
    a device/language listing containing identifying information and the native language for mobile devices within the specified geographic area;
    a listing manager configured to maintain the device/language listing; and
    a message handler configured to convert the announcement to the specified format for the wireless communications message and translate the announcement to the native languages indicated in the device/language listing that differ from the predetermined default language.

10. The system of claim 9, wherein the message handler further comprises:
    an agent application operating locally on each mobile device, wherein said agent application is responsible for the translation of the announcement to the native language of the mobile device, wherein the message handler provides the agent application with the announcement in the predetermined default language.

11. The system of claim 9, wherein the message handler further comprises:
    a speech-to-text engine configured to convert speech input to text output, wherein said speech-to-text engine is able to perform said function for at least one of the predetermined default language and the native language of the plurality of mobile devices; and
    a text-to-speech engine configured to convert text input to speech output, wherein said text-to-speech engine is able to perform said function for at least one of the predetermined default language and the native language of the plurality of mobile devices.

12. The system of claim 8, wherein the multi-lingual module is a component of the digital public address system.

13. The system of claim 8, wherein the multi-lingual module further comprises:
   a translation program capable of translating between a plurality of languages, wherein the plurality of target languages encompasses the native languages of the plurality of mobile devices and the predetermined default language of the digital public address system.

14. The system of claim 13, wherein the translation program is a Web service provided by a third-party entity, wherein components of the multi-lingual module are able to access the translation program using a network connection having Internet access.

15. A computer program product comprising a computer readable storage medium having computer usable program code embodied therewith, the computer usable program code comprising:
   computer usable program code configured to maintain a listing of mobile devices currently active within a specified geographic area serviced by a public address system, wherein a native language of a mobile device that is different than a language used by the public address system is automatically noted from the mobile device;
   computer usable program code configured to convert content for an announcement broadcast by the public address system into a format capable of being transmitted via a wireless communications message;
   computer usable program code configured to translate the converted content to native languages noted in the listing; and
   computer usable program code configured to push the wireless communications message containing the translated content to corresponding mobile devices having different native languages in the listing and the wireless communications message containing the converted content to a remainder of the mobile devices in the listing via a wireless network local to the specified geographic area, wherein a wireless standard utilized by said wireless network comprises at least one of IEEE 802.11 and IEEE 802.15.

16. The computer program product of claim 15, maintaining the listing further comprises:
   computer usable program code configured to automatically detect a presence of the mobile device within the specified geographic area, wherein said detection provides identifying information about the mobile device necessary for establishing a communications pathway to said mobile device;
   computer usable program code configured to record the mobile device in the listing;
   computer usable program code configured to request the native language used by the mobile device; and
   computer usable program code configured to, when the native language differs from the language used by the public address system, append a record for the mobile device in the listing with the native language.

17. The computer program product of claim 15, wherein converting content further comprises:
   computer usable program code configured to capture audio spoken into an input device of the public address system in a digital format; and
   computer usable program code configured to transform the audio into text using a speech-to-text engine.

18. The computer program product of claim 17, wherein, when the content is to be provided in an audio format, said translating of the content further comprises:
   computer usable program code configured to return the text of the translated content to audio using a text-to-speech engine appropriate to the corresponding native language.

19. The computer program product of claim 15, wherein converting content further comprises:
   computer usable program code configured to capture text provided as input for the announcement in a digital format.

20. The computer program product of claim 19, wherein, when the content is to be provided in an audio format, said translating of the content further comprises:
   computer usable program code configured to transform the text of the translated content into audio using a text-to-speech engine appropriate to the corresponding native language.

* * * * *